US012595184B2

(12) United States Patent
Yamada et al.

(10) Patent No.: US 12,595,184 B2
(45) Date of Patent: Apr. 7, 2026

(54) INORGANIC OXIDE PARTICLES

(71) Applicant: Resonac Corporation, Tokyo (JP)

(72) Inventors: Yusuke Yamada, Tokyo (JP); Hiroshi Tsuzuki, Tokyo (JP); Hiroki Sugimoto, Tokyo (JP)

(73) Assignee: Resonac Corporation, Tokyo (JP)

( * ) Notice: Subject to any disclaimer, the term of this patent is extended or adjusted under 35 U.S.C. 154(b) by 0 days.

(21) Appl. No.: 18/863,072

(22) PCT Filed: Dec. 20, 2023

(86) PCT No.: PCT/JP2023/045600
§ 371 (c)(1),
(2) Date: Nov. 5, 2024

(87) PCT Pub. No.: WO2024/143081
PCT Pub. Date: Jul. 4, 2024

(65) Prior Publication Data
US 2025/0162898 A1    May 22, 2025

(30) Foreign Application Priority Data

Dec. 26, 2022    (JP) ................................. 2022-208408
Dec. 26, 2022    (JP) ................................. 2022-208468

(51) Int. Cl.
| | |
|---|---|
| *C01F 7/021* | (2022.01) |
| *B28B 1/00* | (2006.01) |
| *C01F 7/02* | (2022.01) |
| *C04B 35/111* | (2006.01) |
| *C04B 35/63* | (2006.01) |
| *C04B 35/64* | (2006.01) |
| *B33Y 10/00* | (2015.01) |
| *B33Y 70/00* | (2020.01) |
| *B33Y 80/00* | (2015.01) |

(52) U.S. Cl.
CPC .............. *C01F 7/021* (2013.01); *B28B 1/001* (2013.01); *C01F 7/02* (2013.01); *C04B 35/1115* (2013.01); *C04B 35/63* (2013.01); *C04B 35/64* (2013.01); *B33Y 10/00* (2014.12); *B33Y 70/00* (2014.12); *B33Y 80/00* (2014.12); *C01P 2004/32* (2013.01); *C01P 2004/51* (2013.01); *C01P 2004/61* (2013.01); *C01P 2006/10* (2013.01); *C01P 2006/11* (2013.01); *C01P 2006/12* (2013.01); *C04B 2235/528* (2013.01); *C04B 2235/5436* (2013.01); *C04B 2235/5472* (2013.01)

(58) Field of Classification Search
CPC ............. C01F 7/021; C01F 7/02; C04B 35/63
See application file for complete search history.

(56) References Cited

U.S. PATENT DOCUMENTS

| | | | |
|---|---|---|---|
| 2020/0115284 A1 | 4/2020 | Hoel et al. | |
| 2021/0171814 A1 | 6/2021 | Sarangi et al. | |
| 2021/0394265 A1 * | 12/2021 | Rushkin | .................... B22F 1/10 |
| 2022/0250149 A1 * | 8/2022 | Gibson | ................. B22F 3/1021 |

FOREIGN PATENT DOCUMENTS

| | | |
|---|---|---|
| CN | 109311759 A | 2/2019 |
| JP | 2016-117069 A | 6/2016 |
| JP | 2016-182697 A | 10/2016 |
| JP | 2018-130835 A | 8/2018 |
| JP | 2019-513900 A | 5/2019 |
| JP | 2019-525967 A | 9/2019 |
| JP | 2021-011050 A | 2/2021 |
| WO | 2021/002040 A1 | 1/2021 |
| WO | 2022/091978 A1 | 5/2022 |

OTHER PUBLICATIONS

Huang Shilan et al. "Effect of Alumina Powder Particle Size Distribution on Shrinkage", Electric porcelain arrester, Dec. 31, 1998, Issue 4 (Total Issue 164), pp. 25-27 (6 pages).
Wang Di et al., "3D Printing Technology and Applications", South China University of Technology Press, p. 79-80, Oct. 31, 2020, (8 pages).
Wu Guoqing, "Fundamentals and Applications of 3D Printing Technology", Beijing Institute of Technology Press, p. 84, Jul. 31, 2021, (6 pages).
Lee et al., "Effect of alumina particle size and distribution on infiltration rate and fracture toughness of alumina-glass composites prepared by melt infiltration", Materials Science and Engineering A341, 2003, pp. 98-105 (8 pages).
Lanzetta et al., "Improved surface finish in 3D printing using bimodal powder distribution", Rapid Prototyping Journal, 2003, vol. 9, No. 3, pp. 157-166 (10 pages).

* cited by examiner

*Primary Examiner* — James A Fiorito
(74) *Attorney, Agent, or Firm* — Sughrue Mion, PLLC

(57) ABSTRACT

Inorganic oxide particles having a D50 of 5.5-9.0 μm and a pressure loss of 1.75-2.81 kPa in air permeation at a pressure of 12 kPa.

12 Claims, No Drawings

INORGANIC OXIDE PARTICLES

CROSS REFERENCE TO RELATED APPLICATIONS

This application is a National Stage of International Application No. PCT/JP2023/045600 filed Dec. 20, 2023, claiming priorities based on Japanese Patent Application No. 2022-208468 filed Dec. 26, 2022 and on Japanese Patent Application No. 2022-208408 filed Dec. 26, 2022.

TECHNICAL FIELD

The present disclosure relates to an inorganic oxide particle, a sintered body thereof, and a method for producing a binder-jet additively manufactured article.

BACKGROUND

In recent years, a processing method called additive manufacturing (AM) technology, 3D printing technology, or the like has attracted attention. This is a technique for obtaining a target manufactured article by preparing and layering a sectional shape based on three-dimensional shape data on the target manufactured article. As the additive manufacturing techniques, there are known processing methods, such as binder jetting (Patent Literature 1) in which a binder is injected onto a powder material at a manufacturing stage to selectively manufacture a manufactured article, material jetting in which a photocurable resin or the like is injected from an ink jet nozzle to selectively manufacture a manufactured article, powder bed fusion in which a powder bed spread with a metal powder or the like is irradiated with a laser or an electron beam to selectively melt the powder and manufacture a manufactured article, and stereolithography (Patent Literature 2) in which a slurry obtained by mixing a liquid photocurable resin and an inorganic powder is irradiated with light in order to create a manufactured article.

CITATION LIST

Patent Literature

[PTL 1] JP 2016-117069 A
[PTL 2] JP 2021-11050 A

SUMMARY OF INVENTION

Technical Problem

Binder jetting is also known by the term "3D ink jet powder printing". The method includes, for example, a step of supplying a powder material to a manufacturing stage using a roller to form a uniform powder layer, and a step of applying a liquid binder to the powder layer by an inkjet printhead to selectively bind portions of the powder layer. By repeating these steps, a target three-dimensional additively manufactured article can be obtained. Thereafter, the three-dimensional additively manufactured article is subjected to a sintering treatment, as necessary. In binder jetting, a structure, in which the distribution of constituent materials is non-uniform, such as voids, may be generated in the obtained three-dimensional additively manufactured article. In order to suppress this, it is desirable for the additive manufacturing powder to have a favorable laying property so that it can be smoothly supplied to the manufacturing stage and can be uniformly laid. In addition, it is believed that a highly uniform three-dimensional additively manufactured article can be obtained by filling the additive manufacturing powder at a high density. In order to achieve favorable laying property and high density filling, it is useful to increase the fluidity of the powder material. On the other hand, when the binder is applied, it is also required that the powder layer not be disturbed and that the binder can penetrate into the powder material. Furthermore, it is also desired that the shrinkage rate during sintering be low.

The present disclosure provides an inorganic oxide particle that, when used as an additive manufacturing powder, has appropriate fluidity which achieves both favorable laying property capable of forming a uniform powder layer and shape stability capable of maintaining a shape from application of a binder to a sintering treatment, and an appropriate bulk density which allows a binder to penetrate into powder material and realizes a low shrinkage rate during sintering.

Solution to Problem

The content of the present disclosure relates to the following matters.

[1]

An inorganic oxide particle, wherein

D50 is 5.5 to 9.0 μm, and a pressure loss for permeation of air under a pressure of 12 kPa is 1.75 to 2.81 kPa.

[2]

The inorganic oxide particle according to aspect [1], wherein (D10+D90)/D50 is 2.7 or more.

[3]

The inorganic oxide particle according to aspect [1] or [2], wherein a BET specific surface area is 0.10 to 10.00 m$^2$/g.

[4]

The inorganic oxide particle according to any one of aspects [1] to [3], wherein a volume ratio of a particle having a particle diameter of 16.8 to 60.0 μm is 4.3 to 33.5% by volume.

[5]

The inorganic oxide particle according to any one of aspects [1] to [4], wherein a volume ratio of a particle having a particle diameter of 2.0 μm or more is 90.0% by volume or more.

[6]

The inorganic oxide particle according to any one of aspects [1] to [5], which is alumina.

[7]

The inorganic oxide particle according to any one of aspects [1] to [6], wherein circularity is 0.90 or more.

[8]

The inorganic oxide particle according to any one of aspects [1] to [7], which is used in a powder additive manufacturing method.

[9]

The inorganic oxide particle according to aspect [6], wherein a press-molding bulk density under a pressure of 98 MPa is 2.45 to 2.54 g/cm$^3$.

[10]

A sintered body of the inorganic oxide particle according to any one of aspects [1] to [9].

3

[11]

A method for producing a binder-jet additively manufactured article, the method comprising:

applying a liquid containing a binder to the inorganic oxide particle according to any one of aspects [1] to [9] to form a three-dimensional additively manufactured article.

[12]

A method for producing a sintered body, the method comprising:

applying a liquid containing a binder to the inorganic oxide particle according to any one of aspects [1] to [9] to form a three-dimensional additively manufactured article; and carrying out a sintering treatment on the three-dimensional additively manufactured article.

Advantageous Effects of Invention

According to the present disclosure, it is possible to provide an inorganic oxide particle that, when used as an additive manufacturing powder, has appropriate fluidity which achieves both favorable laying property capable of forming a uniform powder layer and shape stability capable of maintaining a shape from application of a binder to a sintering treatment, and an appropriate bulk density which allows a binder to penetrate into powder material and realizes a low shrinkage rate during sintering.

DESCRIPTION OF EMBODIMENTS

Hereinafter, embodiments of the present invention will be described. It should be noted that the embodiments described below are representative examples of the present invention, and are not limited thereto.

In the present specification, when "to" is used for a numerical range, the numerical values at both ends are an upper limit value and a lower limit value, respectively, and are included in the numerical range. When a plurality of upper limit values or lower limit values are described, a numerical range can be created from all combinations of the upper limit values and the lower limit values. Similarly, when a plurality of numerical ranges are described, the upper limit value and the lower limit value can be individually selected and combined from the numerical ranges to create separate numerical ranges.

In the present specification, D10, D50, and D90 are respectively a 10% particle diameter, a 50% particle diameter, and a 90% particle diameter in a volume-based cumulative particle size distribution measured using an electric resistance method particle size distribution measuring apparatus (Beckman Coulter, Inc., MULTISIZER 4) in which an aperture size is set to 100 μm.

In the present specification, the press-molding bulk density means the density of a formed article formed by filling a sample in a circular mold having an inner diameter of 30 mm and pressing the sample under a predetermined pressure using a commercially available pressing machine. The press-molding bulk density is a value serving as an index of bulk density of a powder layer when a thin layer of powder is formed by a roller or the like.

In the present specification, the angle of repose is a value measured and calculated according to JIS R 9301-2-2:1999 (alumina powder-Part 2: determination of physical properties-2: angle of repose).

In the present specification, the BET specific surface area is a value measured and calculated in accordance with "6.2 Flow method (3.5) One-point method" of JIS R 1626:1996 (Measuring methods for the specific surface area of fine ceramic powders by gas adsorption using the BET method). The measurement is carried out using the nitrogen gas as an adsorbent after heating the sample to 180° C. as pretreatment, and then allowing a nitrogen gas to flow for 20 minutes.

In the present specification, the circularity is an average value of values calculated by the following formula (1) for 2000 or more particles, wherein S is an area of a particle projection obtained by an image type particle size distribution measuring apparatus, and L is a perimeter of the particle projection.

$$4\pi S/L^2 \tag{1}$$

In the present specification, the pressure loss for permeation of air under a predetermined pressure is a pressure loss when air at normal temperature (23° C.) is passed through the powder layer at a linear velocity of 2 mm/sec as measured using a powder rheometer FT4 (Freeman Technology Ltd.). Specifically, a sample is placed in a column having a column diameter of 25 mm and a column length of 20 mm, and measurement is carried out in a state where the powder layer is pressurized at a predetermined pressure using a mesh-like piston. Before the measurement, the powder placed in the column is conditioned downward three times. The sample amount is 10 mL based on the volume after conditioning.

<Inorganic Oxide Particles>

The inorganic oxide particles have a D50 of 5.5 to 9.0 μm and a pressure loss of 1.75 to 2.81 kPa for permeation of air under a pressure of 12 kPa. By satisfying the above range, a favorable balance between fluidity and bulk density of the powder material can be achieved.

The circularity of the inorganic oxide particles is preferably 0.90 or more. When the circularity is 0.90 or more, friction between particles is small, so that favorable fluidity can be obtained. When the circularity is 0.90 or more, the filling property of the particles is enhanced, so that the press-molding bulk density can be increased. From the same viewpoint, the circularity of the inorganic oxide particles is preferably 0.93 or more, and more preferably 0.95 or more. The upper limit of the circularity of the inorganic oxide particles is not particularly limited, and may be, for example, 1.00 or 0.99.

The pressure loss of the inorganic oxide particles for permeation of air under a pressure of 12 kPa is 1.75 kPa or more, preferably 2.00 kPa or more, and more preferably 2.20 kPa or more. The pressure loss of the inorganic oxide particles for permeation of air under a pressure of 12 kPa is 2.81 kPa or less, preferably 2.79 kPa or less, and more preferably 2.77 kPa or less. When the pressure loss is 1.75 kPa or more, it is considered that a low shrinkage rate during sintering can be realized. In the inorganic oxide particles in which D50 is not too large and the pressure loss for permeation of air under a pressure of 12 kPa is 2.81 kPa or less, the bulk density is moderate, and a binder easily penetrates into the powder material.

The D50 of the inorganic oxide particles is 5.5 μm or more, preferably 6.0 μm or more, and more preferably 6.5 μm or more. The D50 of the inorganic oxide particles is 9.0 μm or more. The D50 of the inorganic oxide particles is 9.0 μm or less, preferably 8.5 μm or less, and more preferably 8.0 μm or less. When the D50 of the inorganic oxide particles is 5.5 μm or more, the filling property of the particles is enhanced, so that the press-molding bulk density can be increased. When the D50 of the inorganic oxide particles is 5.5 μm or more, in a case where the inorganic oxide particles are used as the additive manufacturing powder, the shape stability of the formed powder layer is favorable, and the shrinkage rate during sintering can be reduced. When the D50 of the inorganic oxide particles is 9.0 μm or less, the filling property and fluidity of the particles can be in a range suitable for powder additive manufacturing and coating applications.

The D10 of the inorganic oxide particles is preferably 1.0 to 4.0 μm, more preferably 2.0 to 3.8 μm, and still more preferably 3.0 to 3.6 μm. When the D10 of the inorganic oxide particles is 1.0 μm or more, the filling property of the particles is enhanced, so that the press-molding bulk density can be increased. When the D10 of the inorganic oxide particles is 1.0 μm or more, in a case where the inorganic oxide particles are used as the additive manufacturing powder, the shrinkage rate during sintering can be reduced. When the D10 of the inorganic oxide particles is 4.0 μm or less, the filling property and fluidity of the particles can be in a range suitable for powder additive manufacturing and coating applications.

The D90 of the inorganic oxide particles is preferably 13.0 to 40.0 μm, more preferably 15.0 to 30.0 μm, and still more preferably 21.0 to 25.0 μm. When the D90 of the inorganic oxide particles is 13.0 μm or more, the filling property of the particles is enhanced, so that the press-molding bulk density can be increased. When the D90 of the inorganic oxide particles is 13.0 μm or more, in a case where the inorganic oxide particles are used as the additive manufacturing powder, the shape stability of the formed powder layer is favorable. When the D90 of the inorganic oxide particles is 40.0 μm or less, the filling property and fluidity of the particles can be in a range suitable for powder additive manufacturing and coating applications. When the D90 of the inorganic oxide particles is 40.0 μm or less, in a case where the inorganic oxide particles are used as the additive manufacturing powder, the uniformity of the formed powder layer is favorable.

The volume ratio of the particles having a particle diameter of 16.8 to 60.0 μm in the inorganic oxide particles is preferably 4.3% by volume or more, more preferably 10.0% by volume or more, and still more preferably 15.0% by volume or more. The volume ratio of the particles having a particle diameter of 16.8 to 60.0 μm in the inorganic oxide particles is preferably 33.5% by volume or less, more preferably 21.0% by volume or less, and still more preferably 20.0% by volume or less. When the volume ratio of the particles having a particle diameter of 16.8 to 60.0 μm is within the above ranges, appropriate fluidity can be expected when the inorganic oxide particles are used as the additive manufacturing powder. The volume ratio of particles having a particle diameter of 16.8 to 60.0 μm in the inorganic oxide particles is a value determined using an electric resistance method particle size distribution measuring apparatus (Beckman Coulter, Inc., MULTISIZER 4) in which an aperture size is set to 100 μm.

The volume ratio of the particles having a particle diameter of 2.0 μm or more in the inorganic oxide particles is preferably 90.0 to 100% by volume, more preferably 93.0 to 100% by volume, and still more preferably 95.0 to 100% by volume. When the volume ratio of the particles having a particle diameter of 2.0 μm or more is 90.0% by volume or more, the shrinkage rate during sintering can be reduced when the inorganic oxide particles are used as the additive manufacturing powder. The volume ratio of particles having a particle diameter of 2.0 μm or more in the inorganic oxide particles is a value determined by a laser diffraction/scattering particle size distribution measuring apparatus (MicrotracBEL Corporation, MT3300EXII).

The ratio of D50 to D10 (D50/D10) of the inorganic oxide particles is preferably 2.0 to 2.3. When the D50/D10 is within the above range, in the case of using the inorganic oxide particles in binder jetting, appropriate fluidity that achieves both favorable laying property capable of forming a uniform powder layer and shape stability capable of maintaining a shape from application of a binder to a sintering treatment can be expected.

The ratio of D90 to D10 (D90/D10) of the inorganic oxide particles is preferably 4.0 to 8.0, more preferably 5.0 to 7.5, and still more preferably 5.5 to 7.0. When the D90/D10 is 8.0 or less, the particle size distribution of the inorganic oxide particles falls within a certain range, and thus fine particles are appropriately arranged between coarse particles in the case of being used as an additive manufacturing powder, and the appropriate fluidity can be achieved. When the D90/D10 is 4.0 or more, fine particles are appropriately arranged between coarse particles in the case of using the inorganic oxide particles as the additive manufacturing powder, and the appropriate bulk density can be achieved.

The ratio of D90 to D50 (D90/D50) of the inorganic oxide particles is preferably 2.3 to 3.6, more preferably 2.5 to 3.5, and still more preferably 2.8 to 3.4. When the D90/D50 is 3.6 or less, the particle size distribution of the inorganic oxide particles falls within a certain range, and thus fine particles are appropriately arranged between coarse particles in the case of being used as an additive manufacturing powder, and the appropriate fluidity can be achieved. When the D90/D50 is 2.3 or more, fine particles are appropriately arranged between coarse particles in the case of using the inorganic oxide particles as an additive manufacturing powder, and the appropriate bulk density can be achieved.

In the inorganic oxide particles, D10, D50, and D90 preferably satisfy the relationship of the following formula (I).

$$(D10 + D90)/D50 \geq 2.7 \tag{I}$$

(D10+D90)/D50 is an index of the particle size distribution of the inorganic oxide particles, and means that the larger the value, the wider the particle size distribution width. When the value of (D10+D90)/D50 is 2.7 or more, i.e., the inorganic oxide particles satisfy the relationship of the formula (I), the particles have a moderately wide particle size distribution width. In this case, the powder material is more likely to be appropriately filled so that the binder can penetrate into the powder material. The value of (D10+D90)/D50 is more preferably 2.9 or more, and still more preferably 3.0 or more. The value of (D10+D90)/D50 is preferably 6.0 or less, and more preferably 4.0 or less.

The angle of repose of the inorganic oxide particles is preferably 55 to 59°, and more preferably 56 to 58°. The angle of repose is one of indices indicating the fluidity of the powder. When the angle of repose of the inorganic oxide particles is 55° or more, the shape stability of the powder layer formed using the inorganic oxide particles as the additive manufacturing powder is favorable. When the angle of repose of the inorganic oxide particles is 59° or less, in a case where the inorganic oxide particles are used in the powder additive manufacturing method, the inorganic oxide particles can be smoothly supplied to the manufacturing stage and uniformly spread.

The BET specific surface area of the inorganic oxide particles is preferably 0.10 $m^2/g$ or more, more preferably 0.20 $m^2/g$ or more, and still more preferably 0.30 $m^2/g$ or more. The BET specific surface area of the inorganic oxide particles is preferably 10.00 $m^2/g$ or less, more preferably 5.00 $m^2/g$ or less, still more preferably 2.00 $m^2/g$ or less, and particularly preferably 0.50 $m^2/g$ or less. The BET specific surface area of the inorganic oxide particles is preferably 0.10 to 10.00 $m^2/g$, more preferably 0.10 to 5.00 $m^2/g$, still more preferably 0.20 to 2.00 $m^2/g$, and particularly preferably 0.30 to 0.50 $m^2/g$. When the BET specific surface area is 0.10 $m^2/g$ or more, the shape stability of the powder layer formed using the inorganic oxide particles as the additive manufacturing powder is favorable. When the BET specific surface area is 10.00 $m^2/g$ or less, in a case where the inorganic oxide particles are used in the powder additive manufacturing method, the inorganic oxide particles can be smoothly supplied to the manufacturing stage and uniformly spread.

The shape of the inorganic oxide particles is not particularly limited. Examples thereof include a spherical shape, an elliptical shape, a scaly shape, and an amorphous shape. Among them, a spherical shape is preferable because an appropriate bulk density is easily obtained.

The inorganic oxide particles are preferably at least one selected from silica, alumina, zirconia, and titania, more preferably alumina, and more preferably spherical alumina. Alumina is preferable in that it has high thermal conductivity, melting point, and hardness, is inexpensive, and is resistant to acids and alkalis. The volume ratio of alumina in the inorganic oxide particles is preferably 50% by volume or more, more preferably 60% by volume or more, and still more preferably 80% by volume or more. The upper limit of the volume ratio of alumina in the inorganic oxide particles is not particularly limited, and may be, for example, 100% by volume, 98% by volume, or 95% by volume.

When the inorganic oxide particles are alumina, the press-molding bulk density of the inorganic oxide particles under a pressure of 98 MPa is preferably 2.45 to 2.54 $g/cm^3$. When the press-molding bulk density of the inorganic oxide particles under a pressure of 98 MPa is 2.45 $g/cm^3$ or more, dimensional stability during sintering is favorable in the case of using the inorganic oxide particles as the additive manufacturing powder. When the press-molding bulk density of the inorganic oxide particles under a pressure of 98 MPa is 2.54 $g/cm^3$ or less, in a case where the inorganic oxide particles are used in binder jetting, the binder easily penetrates into the powder material at the time of applying binder, and the sufficient strength of the manufactured article and the sintered body can be obtained.

The inorganic oxide particles are suitably used in the powder additive manufacturing method. By using the inorganic oxide particles, a manufactured article having fewer voids can be formed, and an effect of reducing heat shrinkage during a sintering treatment on the manufactured article can be expected. In particular, since the inorganic oxide particles have favorable laying property and shape stability of a powder layer, and an appropriate bulk density, the inorganic oxide particles are suitably used in binder jetting in which a liquid binder is injected to spread powder material to be solidified. The inorganic oxide particles can also be applied to powder bed fusion in which a powder bed spread with a powder material is irradiated with a laser or an electron beam to selectively melt the powder and manufacture a manufactured article, and other powder additive manufacturing methods.

Since the inorganic oxide particles have appropriate fluidity, and appropriate bulk density so that a liquid is likely to be impregnated, the inorganic oxide particles can be used as a filler material that imparts fluidity and thermal conductivity. Specifically, it can be used as a filler in a heat dissipation material, for example, a filler in a coating material, such as a heat dissipation coating material, a heat shielding coating material, or an abrasion resistance coating material required to have favorable coatability, a filler in a thermally conductive resin composition having adhesiveness, or a filler in a thermally conductive coating material having a function of curing in the air.

<Method for Producing Inorganic Oxide Particles>

The inorganic oxide particles can be produced, for example, by mixing a plurality of inorganic oxide particles having different particle size distributions so that the particle size distribution of the inorganic oxide particles falls within a predetermined range. The particle size distribution of the inorganic oxide particles may be adjusted by sieving or the like. The particle size distribution of the inorganic oxide particles can be adjusted to an appropriate range by selecting the type and blending amount of inorganic oxide particles to be blended. The method for mixing the materials is not particularly limited, and examples thereof include a method for dry-mixing or wet-mixing the materials. Mixing may be carried out manually or using a blender.

As a more specific method for producing the inorganic oxide particles, for example, a method for mixing the following coarse inorganic oxide particles (A) and fine inorganic oxide particles (B) in which D50 is smaller than that of the coarse inorganic oxide particles (A) can be mentioned. The coarse inorganic oxide particles (A) and the fine inorganic oxide particles (B) may be different types of inorganic oxide particles, or may be the same type of inorganic oxide particles. The same type of inorganic oxide particles is preferable because the particles are easily mixed and dispersed uniformly.

[Coarse Inorganic Oxide Particles (A)]

The D50 of the coarse inorganic oxide particles (A) used is preferably 9.0 to 25.0 μm, more preferably 12.0 to 20.0 μm, and still more preferably 14.0 to 18.0 μm. The D10 of the coarse inorganic oxide particles (A) is preferably 1.0 to 8.0 μm, more preferably 2.0 to 7.5 μm, and still more preferably 3.0 to 7.0 μm. The D90 of the coarse inorganic oxide particles (A) is preferably 28.0 to 40.0 μm, more preferably 28.5 to 38.0 μm, and still more preferably 29.0 to 36.0 μm.

The ratio of D50 to D10 (D50/D10) of the coarse inorganic oxide particles (A) is preferably 1.5 to 3.5, more preferably 1.7 to 3.2, and still more preferably 2.0 to 3.0. The ratio of D90 to D10 (D90/D10) of the coarse inorganic oxide particles (A) is preferably 3.5 to 9.0, more preferably 4.0 to 7.0, and still more preferably 4.5 to 6.0. The ratio of D90 to D50 (D90/D50) of the coarse inorganic oxide particles (A) is preferably 1.7 to 2.3, more preferably 1.8 to 2.2, and still more preferably 1.9 to 2.0.

The shape of the coarse inorganic oxide particles (A) is not particularly limited. Examples thereof include a spherical shape, an elliptical shape, a scaly shape, and an amorphous shape. Among them, a spherical shape is preferable because an appropriate bulk density is easily obtained.

The coarse inorganic oxide particles (A) are preferably at least one selected from silica, alumina, zirconia, and titania, more preferably alumina, and still more preferably spherical alumina. The volume ratio of alumina in the coarse inorganic oxide particles (A) is preferably 50% by volume or more, more preferably 60% by volume or more, and still more preferably 80% by volume or more. The upper limit of the volume ratio of alumina in the coarse inorganic oxide particles (A) is not particularly limited, and may be, for example, 100% by volume, 98% by volume, or 95% by volume.

[Fine Inorganic Oxide Particles (B)]

The D50 of the fine inorganic oxide particles (B) is smaller than the D50 of the coarse inorganic oxide particles (A). The D50 of the fine inorganic oxide particles (B) used is preferably 5.0 to 8.0 μm, more preferably 5.5 to 7.8 μm, and still more preferably 6.0 to 7.5 μm. The D10 of the fine inorganic oxide particles (B) is preferably 1.0 to 4.0 μm, more preferably 2.0 to 3.8 μm, and still more preferably 2.5 to 3.5 μm. The D90 of the fine inorganic oxide particles (B) is preferably 9.0 to 25.0 μm, more preferably 12.0 to 24.0 μm, and still more preferably 14.0 to 23.0 μm.

The ratio of D50 to D10 (D50/D10) of the fine inorganic oxide particles (B) is preferably 1.5 to 5.0, more preferably 1.7 to 4.0, and still more preferably 1.8 to 3.0. The ratio of D90 to D10 (D90/D10) of the fine inorganic oxide particles (B) is preferably 3.5 to 9.0, more preferably 4.5 to 8.0, and still more preferably 5.5 to 7.0. The ratio of D90 to D50 (D90/D50) of the fine inorganic oxide particles (B) is preferably 2.5 to 3.5, more preferably 2.7 to 3.2, and still more preferably 2.9 to 3.1.

The shape of the fine inorganic oxide particles (B) is not particularly limited. Examples thereof include a spherical shape, an elliptical shape, a scaly shape, and an amorphous shape. Among them, a spherical shape is preferable because an appropriate bulk density is easily obtained.

The fine inorganic oxide particles (B) are preferably at least one selected from silica, alumina, zirconia, and titania, more preferably alumina, and still more preferably spherical alumina. The volume ratio of alumina in the fine inorganic oxide particles (B) is preferably 50% by volume or more, more preferably 60% by volume or more, and still more preferably 80% by volume or more. The upper limit of the volume ratio of alumina in the fine inorganic oxide particles (B) is not particularly limited, and may be, for example, 100% by volume, 98% by volume, or 95% by volume.

The volume ratio of the coarse inorganic oxide particles (A) to the total volume of the coarse inorganic oxide particles (A) and the fine inorganic oxide particles (B) before mixing is selected so that the particle size distribution of the inorganic oxide particles falls within an appropriate range, and may be, for example, 9.5 to 29.0% by volume.

<Method for Producing Three-Dimensional Additively Manufactured Article>

The three-dimensional additively manufactured article can be produced by processing inorganic oxide particles by a known powder additive manufacturing method. Examples of the powder additive manufacturing method include binder jetting and powder bed fusion. The powder additive manufacturing method using the inorganic oxide particles as the additive manufacturing powder generally includes the following steps.

(1) Step of supplying inorganic oxide particles to a manufacturing stage of powder additive manufacturing apparatus (2) Step of uniformly spreading the supplied inorganic oxide particles thinly with a roller or the like to form a thin layer of inorganic oxide particles (3) Step of irradiating the formed thin layer of inorganic oxide particles with laser or electron beam to bind inorganic oxide particles, or applying liquid containing a binder to the formed thin layer of inorganic oxide particles to bind inorganic oxide particles (4) Step of supplying new inorganic oxide particles on the solidified inorganic oxide particles Thereafter, by repeating steps (2) to (4), a target three-dimensional additively manufactured article can be produced.

As a method for applying a liquid containing a binder, a method for discharging a liquid containing a binder is preferable. The method for discharging the liquid containing the binder is not particularly limited, and examples thereof include a dispenser method, a spray method, and an inkjet method. Among them, the inkjet method is preferable because the quantitativity of the droplets is favorable and a large area can be applied.

When the ink jet method is used, the liquid containing the binder can be applied by an ink jet head having a nozzle for discharging the liquid. As the ink jet head, an ink jet head in a known ink jet printer can be suitably used, and examples thereof include industrial ink jet RICOH MH/GH series (Ricoh Co., Ltd.).

The binder is not particularly limited, but a known binder, such as polyvinyl pyrrolidone, polyvinyl alcohol, polyethylene glycol, polyvinyl butyral, an acrylic resin, or polyamide can be used. The binder can be used by adjusting the viscosity with an appropriate solvent.

<Method for Producing Sintered Body>

A sintered body can be produced by sintering the three-dimensional additively manufactured article by a known sintering method. It is preferable to carry out a degreasing treatment before the sintering treatment. A specific method for producing a sintered body is exemplified below.

The three-dimensional additively manufactured article is placed in a sintering furnace, and the temperature in the furnace is raised to a degreasing treatment temperature. The degreasing treatment temperature can be appropriately set, for example, in the range of 500° C. to 700° C. Thereafter, a degreasing treatment is carried out in which the temperature in the furnace is maintained at the degreasing treatment temperature for 0.5 to 4 hours to burn an organic component. The degreasing treatment is carried out in an air atmosphere. The degreasing time can be set according to the type of binder and the organic component ratio in the three-dimensional additively manufactured article. Next, the temperature in the furnace is raised to a sintering treatment temperature. The sintering treatment temperature can be appropriately set, for example, in the range of 900° C. to 1300° C. Thereafter, a sintering treatment is carried out in which the temperature in the furnace is maintained at the sintering treatment temperature for 1 to 7 hours, and the three-dimensional additively manufactured article is sintered to obtain a sintered body. The sintering temperature and the sintering time can be set according to the type of the inorganic oxide particles. The sintering treatment may be carried out under an inert gas atmosphere or an air atmosphere.

EXAMPLES

Hereinafter, the present invention will be described more specifically with reference to Examples and Comparative Examples, but the present invention is not limited to the following Examples.

<Materials Used>

Coarse inorganic oxide particles (A): spherical alumina (Alunabeads (trademark)/CB, Resonac Corporation): true density 3.95 g/m$^3$ Coarse inorganic oxide particles (B): spherical alumina (Alunabeads (trademark)/CB, Resonac Corporation): true density 3.95 g/m³

<Evaluation Method>

(Bulk Density)

The bulk density was evaluated by press-molding bulk density under a pressure of 98 MPa. Specifically, the sample was filled in a circular mold having an inner diameter of 30 mm, and a formed article was produced under a pressure of 98 MPa using a commercially available press machine. The density of the obtained formed article was determined as the press-molding bulk density under a pressure of 98 MPa. When the press-molding bulk density is 2.45 g/cm³ or more, the density of the three-dimensional additively manufactured article produced by using the inorganic oxide particles is high, so that the shrinkage rate during sintering is lowered, which is preferable. When the press-molding bulk density is 2.54 g/cm³ or less, a binder can penetrate into the powder material at the time of applying the binder in binder jetting, which is preferable. That is, when the press-molding bulk density was in the range of 2.45 to 2.54 g/cm³, the bulk density was evaluated to be favorable.

(Circularity)

The area S and the perimeter L were measured using FPIA-3000 (Malvern Panalytical Ltd.). As a pretreatment, about 10 g of a sample was placed in a metal sieve having a diameter of 200 mm and an opening of 25 μm to remove particles larger than 25 μm with shower water, due to the measurement range of the apparatus. The sample under the sieve was transferred to a plastic container and used as a measured sample. LPF/HPF standard (20×lens) and bright field were used as measurement conditions, and a particle sheath (Malvern Panalytical Ltd.) was used as a measurement solvent. 2 g of the sample was weighed in a 50 mL beaker so that the number of effective particles was 2000 or more and the ratio of the number of effective particles/the number of all particles was 55% to 70%, 50 mL of pure water was added thereto, and the mixture was dispersed for 3 minutes in an ultrasonic disperser of 200 W, then the mixture was charged into the apparatus, and the measurement was carried out. As data processing after the measurement, data having a plurality of grains on one screen was deleted, and the circularity was calculated.

(Fluidity)

The fluidity was evaluated by the angle of repose. When the angle of repose is 55° or more, in a case where the inorganic oxide particles are used in binder jetting, the shape stability is excellent in that the shape can be maintained from application of a binder to a sintering treatment. When the angle is 59° or less, in a case where the inorganic oxide particles are used in binder jetting, the laying property is excellent in that the inorganic oxide particles can be smoothly supplied to the manufacturing stage, and be uniformly spread. That is, when the angle of repose was 55° to 59°, the fluidity was evaluated to be favorable from the viewpoint of the balance between the shape stability and the laying property.

(Pressure Loss for Permeation of Air)

The pressure loss for permeation of air was measured under a pressure of 12 kPa.

Example 1

The coarse inorganic oxide particles (A) and the fine inorganic oxide particles (B) having the particle diameters and particle diameter ratios described in Table 1 were mixed using a rocking mixer (RMC-600 (S)/LH, AICHI ELECTRIC CO., LTD.) at a ratio so that the volume ratio of the coarse inorganic oxide particles (A) to the total volume of the coarse inorganic oxide particles (A) and the fine inorganic oxide particles (B) before mixing was 11.1% by volume, thereby obtaining inorganic oxide particles. In Table 1, a particle diameter volume ratio calculated by the following formula (2) is also described.

$$\text{(Volume ratio of coarse inorganic oxide particles (A)} \times \text{D50 of coarse inorganic oxide particles (A))} / \text{(volume ratio of fine inorganic oxide particles(B)} \times \text{D50 of fine inorganic oxide particles (B))} \quad (2)$$

The obtained inorganic oxide particles were evaluated for particle size distribution, BET specific surface area, circularity, fluidity, pressure loss for permeation of air, and press-molding bulk density. The results are shown in Table 2.

Examples 2 to 4, Comparative Examples 1 to 3

Inorganic oxide particles were obtained in the same manner as in Example 1, except that the coarse inorganic oxide particles (A), the fine inorganic oxide particles (B), and the volume ratio of the coarse inorganic oxide particles (A) to the total volume of the coarse inorganic oxide particles (A) and the fine inorganic oxide particles (B) before mixing of were changed as shown in Table 1. In Table 1, the particle diameter volume ratio calculated by the above formula (2) is also described. The obtained inorganic oxide particles were evaluated for particle size distribution, BET specific surface area, circularity, fluidity, pressure loss for permeation of air, and press-molding bulk density. The results are shown in Table 2. Those that were not evaluated are indicated by "-".

TABLE 1

| | Volume ratio of (A) to total volume of (A) and (B) % by volume | Particle diameter volume ratio | Coarse inorganic oxide particles (A) | | | | | | Fine inorganic oxide particles (B) | | | | | |
|---|---|---|---|---|---|---|---|---|---|---|---|---|---|---|
| | | | D10 μm | D50 μm | D90 μm | D50/ D10 | D90/ D10 | D90/ D50 | D10 μm | D50 μm | D90 μm | D50/ D10 | D90/ D10 | D90/ D50 |
| Ex. 1 | 11.1 | 0.30 | 6.4 | 16.4 | 31.4 | 2.6 | 4.9 | 1.9 | 3.3 | 6.8 | 20.5 | 2.1 | 6.3 | 3.0 |
| Ex. 2 | 12.2 | 0.31 | 5.7 | 14.5 | 29.0 | 2.5 | 5.1 | 2.0 | 3.1 | 6.5 | 20.2 | 2.1 | 6.5 | 3.1 |
| Ex. 3 | 12.5 | 0.38 | 6.0 | 17.8 | 31.1 | 2.9 | 5.2 | 1.8 | 3.2 | 6.7 | 17.4 | 2.1 | 5.4 | 2.6 |
| Ex. 4 | 11.1 | 0.35 | 5.6 | 15.8 | 29.2 | 2.8 | 5.3 | 1.8 | 2.8 | 5.7 | 14.3 | 2.1 | 5.2 | 2.5 |

TABLE 1-continued

| | Volume ratio of (A) to total volume of (A) and (B) % by volume | Particle diameter volume ratio — | Coarse inorganic oxide particles (A) | | | | | | Fine inorganic oxide particles (B) | | | | | |
|---|---|---|---|---|---|---|---|---|---|---|---|---|---|---|
| | | | D10 μm | D50 μm | D90 μm | D50/D10 — | D90/D10 — | D90/D50 — | D10 μm | D50 μm | D90 μm | D50/D10 — | D90/D10 — | D90/D50 — |
| Comp. Ex. 1 | 0.0 | — | — | — | — | — | — | — | 2.4 | 4.9 | 9.2 | 2.0 | 3.9 | 1.9 |
| Comp. Ex. 2 | 0.0 | — | — | — | — | — | — | — | 3.4 | 8.2 | 17.0 | 2.4 | 5.0 | 2.1 |
| Comp. Ex. 3 | 100.0 | — | 6.3 | 16.6 | 33.9 | 2.6 | 5.4 | 2.0 | — | — | — | — | — | — |

TABLE 2

| | Circularity [−] | D10 [μm] | D50 [μm] | D90 [μm] | Pressure loss for permeation of air [kPa] | (D10 + D90)/ D50 [−] | D50/D10 [−] | D90/D10 [−] | D90/D50 [−] |
|---|---|---|---|---|---|---|---|---|---|
| Ex. 1 | 0.96 | 3.4 | 7.4 | 23.2 | 2.44 | 3.6 | 2.2 | 6.8 | 3.1 |
| Ex. 2 | 0.95 | 3.2 | 6.9 | 22.9 | 2.77 | 3.8 | 2.1 | 7.0 | 3.3 |
| Ex. 3 | 0.96 | 3.3 | 7.6 | 23.5 | 2.31 | 3.5 | 2.3 | 7.1 | 3.1 |
| Ex. 4 | 0.96 | 3.1 | 6.3 | 15.6 | 2.54 | 3.0 | 2.0 | 5.0 | 2.5 |
| Comp. Ex. 1 | 0.96 | 2.4 | 4.9 | 9.2 | 2.86 | 2.4 | 2.0 | 3.9 | 1.9 |
| Comp. Ex. 2 | 0.95 | 3.4 | 8.2 | 17.0 | 3.28 | 2.5 | 2.4 | 5.0 | 2.1 |
| Comp. Ex. 3 | 0.97 | 6.3 | 16.6 | 33.9 | 1.20 | 2.4 | 2.6 | 5.4 | 2.0 |

| | Volume ratio of particle having particle diameter of 16.8 to 60.0 μm [% by volume] | Volume ratio of particle having particle diameter of 2.0 μm or more [% by volume] | BET specific surface area [m2/g] | Press-molding bulk density [g/cm3] | Angle of repose [°] |
|---|---|---|---|---|---|
| Ex. 1 | 17.2 | 100.0 | 0.43 | 2.52 | 58 |
| Ex. 2 | 17.5 | 100.0 | 0.45 | 2.53 | 55 |
| Ex. 3 | 18.1 | 100.0 | 0.39 | 2.52 | 57 |
| Ex. 4 | 8.7 | 100.0 | — | 2.51 | 57 |
| Comp. Ex. 1 | 0.0 | 97.3 | 0.54 | 2.38 | 52 |
| Comp. Ex. 2 | 10.7 | 100.0 | 0.64 | 2.55 | 55 |
| Comp. Ex. 3 | 49.0 | 100.0 | 0.31 | 2.56 | 36 |

As shown in Examples 1 to 4 and Comparative Examples 1 to 3, the inorganic oxide particles having a D50 of 5.5 to 9.0 μm and a pressure loss for permeation of air under a pressure of 12 kPa of 1.75 to 2.81 kPa have favorable bulk density and fluidity. Examples 1 to 4 have an angle of repose in the range of 55° to 59° and have appropriate fluidity for binder jetting. Therefore, it is considered that in the case of using Examples 1 to 4 in binder jetting, a uniform powder layer can be formed when a thin layer is formed, and the shape can be maintained from application of a binder to a sintering treatment. In addition, Examples 1 to 4 have a press-molding bulk density in the range of 2.45 to 2.54 g/cm³, and have appropriate press-molding bulk density for binder jetting. Therefore, it is considered that in the case of using Examples 1 to 4 in binder jetting, a binder can penetrate into the powder materials, and a low shrinkage rate during sintering can be realized.

In Comparative Example 1, the press-molding bulk density is low, and the reason for this is presumed that adhe-siveness between particles is high because D50 is small, and air is easily taken in during pressing. As a result, when Comparative Example 1 is used in binder jetting, it is presumed that the shrinkage rate during sintering is large. In Comparative Example 2, since D50 is larger than that in Comparative Example 1, it is presumed that the adhesive-ness between particles is lower than that in Comparative Example 1, and the intake of air during pressing is small. In addition to low intake of air, Comparative Example 2 has a high pressure loss for permeation of air under a pressure of 12 kPa, and thus is a material that is likely to be filled at a high density. Such a material has a large press-molding bulk density, and a binder hardly penetrates between particles. Therefore, it is presumed that it is difficult to obtain a desired shape when the material is used in binder jetting. Compara-tive Example 3 is a material having a large D50 and low adhesiveness between particles. The low pressure loss for permeation of air under a pressure of 12 kPa also suggests that the adhesiveness between the particles of Comparative Example 3 is low. Such a material has a small angle of repose, which is an index of fluidity, and it is presumed that it is difficult to form a uniform powder layer when forming a thin layer of the additive manufacturing powder. A material having a large D50 and a low pressure loss for permeation of air under a pressure of 12 kPa is estimated to be a material in which a gap in the powder is easily clogged by pressing. Such a material has a large press-molding bulk density, and a binder hardly penetrates between particles. Therefore, it is presumed that it is difficult to obtain a desired shape when the material is used in binder jetting.

The invention claimed is:

1. An inorganic oxide particle, wherein

D50 is 5.5 to 9.0 µm, a volume ratio of a particle having a particle diameter of 2.0 µm or more is 90.0% by volume or more, and a pressure loss for permeation of air under a pressure of 12 kPa is 1.75 to 2.81 kPa.

2. The inorganic oxide particle according to claim 1, wherein (D10+D90)/D50 is 2.7 or more.

3. The inorganic oxide particle according to claim 1, wherein a BET specific surface area is 0.10 to 10.00 m$^2$/g.

4. The inorganic oxide particle according to claim 1, wherein a volume ratio of a particle having a particle diameter of 16.8 to 60.0 µm is 4.3 to 33.5% by volume.

5. The inorganic oxide particle according to claim 1, which is alumina.

6. The inorganic oxide particle according to claim 1, wherein circularity is 0.90 or more.

7. The inorganic oxide particle according to claim 1, which is used in a powder additive manufacturing method.

8. The inorganic oxide particle according to claim 5, wherein a press-molding bulk density under a pressure of 98 MPa is 2.45 to 2.54 g/cm$^3$.

9. A sintered body of the inorganic oxide particle according to claim 1.

10. A method for producing a binder-jet additively manufactured article, the method comprising:

applying a liquid containing a binder to the inorganic oxide particle according to claim 1 to form a three-dimensional additively manufactured article.

11. A method for producing a sintered body, the method comprising:

applying a liquid containing a binder to the inorganic oxide particle according to claim 1 to form a three-dimensional additively manufactured article; and carrying out a sintering treatment on the three-dimensional additively manufactured article.

12. The inorganic oxide particle according to claim 1, wherein a ratio of D50 to D10 (D50/D10) of the inorganic oxide particles is 2.0 to 2.3.

* * * * *